W. B. GREENE.

METHOD OF MAKING SOLES.

APPLICATION FILED AUG. 4, 1913.

Reissued Apr. 21, 1914.

13,715.

Witnesses.

Louise A. Jordan

Mary J. Vebb

Inventor:

William B. Greene by Clyde L. Rogers his Atty.

UNITED STATES PATENT OFFICE.

WILLIAM B. GREENE, OF NATICK, MASSACHUSETTS.

METHOD OF MAKING SOLES.

13,715. Specification of Reissued Letters Patent. Reissued Apr. 21, 1914.

Original No. 1,008,640, dated November 14, 1911, Serial No. 629,344. Application for reissue filed August 4, 1913. Serial No. 782,997.

*To all whom it may concern:*

Be it known that I, WILLIAM B. GREENE, a citizen of the United States, and resident of Natick, in the county of Middlesex and State of Massachusetts, have invented certain new and useful Improvements in Methods of Making Soles, of which the following is a specification.

This invention has for its object, first, to enable relatively thin sole-leather to be employed in the manufacture of outer soles for boots and shoes, without presenting an undesirably thin edge.

The invention also has for its object to increase the durability of a sole-leather outer sole by compressing the interior body portion of the sole while leaving the marginal edge relatively thick so that the sole when assembled in the shoe presents an appearance of greater thickness; and, in the illustrative embodiment herein shown to provide on the flesh side of the sole a depression, the margin of which extends substantially parallel with the trimmed edge of the sole and forms an abutment or shoulder for the inwardly turned portion of the boot or shoe upper, the portion of the upper which lies on the outer sole being therefore depressed somewhat below the exposed marginal portion of the flesh side of the outer sole.

The invention consists in the improved method of making the sole, as herinafter described and claimed.

Figure 1:
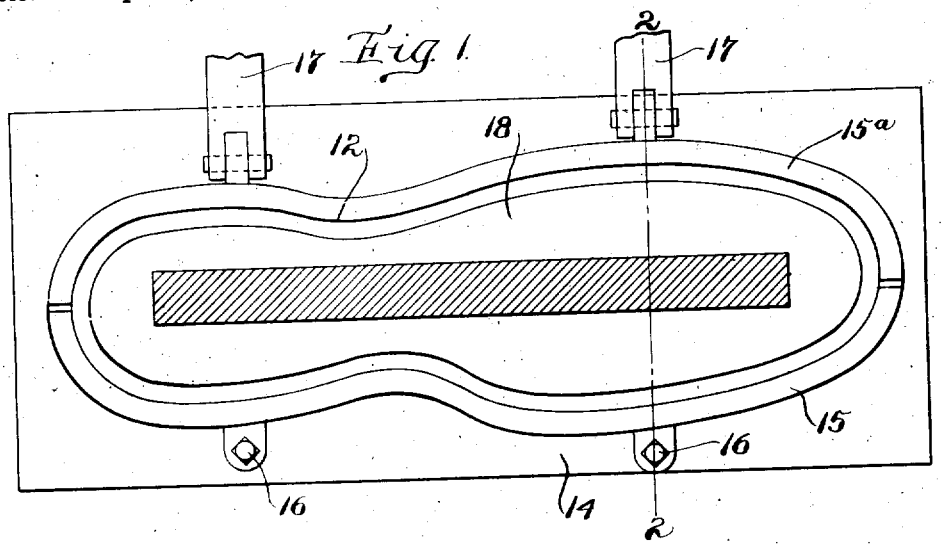
Figure 2:
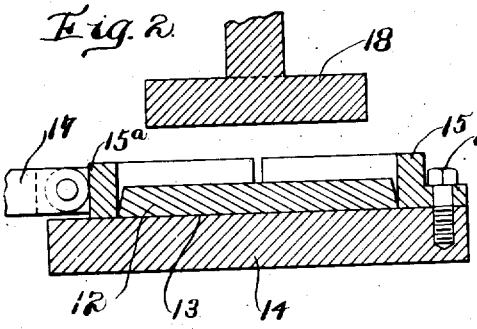
Figure 3:
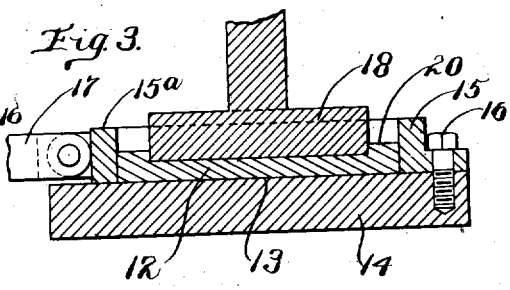
Figure 4:
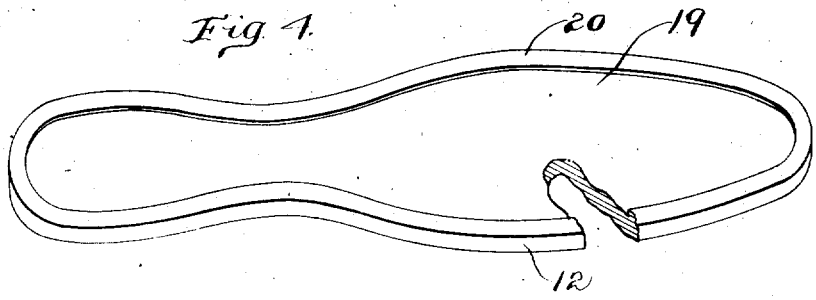

Of the accompanying drawings forming a part of this specification: Figure 1 represents a top plan view illustrating suitable means for producing the sole and practising the method constituting my invention; Fig. 2 represents a section on line 2—2 of Fig. 1 illustrating the first step of the method; Fig. 3 represents a view similar to Fig. 2 illustrating the second step and Fig. 4 represents a perspective view of the completed sole, a portion of the same being broken away.

The same reference characters indicate the same parts in all the figures.

To illustrate one way of carrying out my invention, I take an outer sole 12 which has been cut by a die to give its edge the usual form possessed by an outer sole prior to the final trimming and burnishing operations, and place the same, with the grain side 13 downward, on a suitable bed or support 14 formed to cover the entire area of the grain side, said bed being preferably flat. I confine the edge of the sole in such manner that it cannot be expanded to increase the area of the sole, the confining instrumentality here shown being a carb or die, preferably composed of two sections 15 and 15[a], the inner sides of which are formed accurately fit and bear closely on all parts of the edge of the sole. For convenience in removing the completed sole, the sections 15 and 15[a] are separable from each other, the section 15 being here shown as being rigidly attached by screws 16 to the bed 14 while the section 15[a] is movable toward and from the section 15, suitable means being employed to rigidly hold the section 15[a] in its confining relation to the section 15. In Figs. 1, 2 and 3, I have indicated movable struts 17 hinged to the section 15[a] and adapted to be operated by means not shown, to move the said section toward and from the section 15. The sole, supported and confined as described, is next subjected to pressure which forms an indented central area in its flesh side, and compresses this area, the pressing instrumentality here shown being a platen 18 which is movable toward and from the bed 14 and is of smaller area than the sole, the platen being sole-shaped and arranged so that its edge is parallel with the inner surface of the curb or die and is separated therefrom by a continuous space preferably about one-quarter of an inch in width. The platen is moved from the position shown by Fig. 2 to that shown by Fig. 3 by suitable mechanism not shown, adapted to force the platen into the flesh side of the sole and thus form the indented central area 19, the sole being suitably moistened or "in temper." The pressure imparted by the platen 18, and the confinement of the edge of the sole by the curb, result in the formation of an offset marginal area 20 surrounding the indented area 19, which not being compressed is relatively thick. Said marginal area is composed in part of material displaced from the central portion of the sole by pressure of the platen 18 thereon.

The displaced material is prevented by the curb from moving outwardly to increase the area of the sole so that its displacement is transverse to the faces of the sole. The thickness of the marginal portion of the sole, of which the offset area 20 forms one side, is therefore at least as great as and usually considerably greater than the natural thickness of the leather, while the thickness of the portion of the sole, of which the indented central area forms one side, is considerably less than the natural thickness of the leather. The displacement of the material in forming the offset area 20 causes the compression or compacting of the edge of the sole against the inner surface of the curb to a relatively small degree and not enough to make unduly difficult the operation of sewing through the marginal area 20. The described method results in the formation of a sole, the interior body portion of which is substantially compressed and the edge of which is relatively thickened and does not lose its increased thickness after the removal from the pressing surfaces.

It is to be understood that the edge portion of the sole thus left relatively thick is also of more open texture than the compressed body of the sole, the fibers of the leather being open and approximately in as satisfactory a condition for permitting stitches to be readily passed therethrough as in the untreated sole.

I find that I am able, by treating a sole in the manner described, to so increase the thickness of its edge that the edge will require a trimming tool or iron, as it is technically termed, of considerably greater width than would be required by a sole of the thickness of the original leather.

The thickness of the edge of an outer sole is customarily designated in shoe factories by the size or number of the trimming iron for which it is adapted. I have succeeded in so increasing the thickness of the sole edge in the manner described, that while the original thickness of the leather was such as to require a No. 7 iron, the thickened edge requires a No. 9 iron. These numbers are given merely as examples, it being feasible to increase the thickness of the sole edge by one or more irons.

The sole produced by my improved method is characterized by a substantially flat grain side and a flesh side having an indented central area and an offset marginal area, said indented area forming one surface of a portion of the sole which has a thickness less than the natural thickness of the leather where the marginal area intersects the edge of the sole and is composed in part of material displaced from the central area, the said edge being molded or formed by the pressure of the displaced material against the edge-confining curb and having a permanent thickness which is greater than the natural thickness of the leather.

In cutting out a sole by a die the edge of the sole is usually left by the die somewhat inclined or beveled so that the area of the flesh side is somewhat less than that of the grain side as indicated by Fig. 2. This bevel of the edge requires the removal of more material from the grain side than from the flesh side by the trimmer to give the edge the desired form, waste of material being thus caused. The redistribution of the material at the marginal portion of the sole above described, expands the marginal portion of the flesh side and the portion of the sole edge adjacent thereto, sufficiently to remove the bevel and leave the entire edge at right angles with the sides of the sole. The width of the raised marginal area 20 is such that the final edge of the sole formed by the trimmer, is wholly outside of the shoulder forming the margin of the indented area.

I intend the term sole as herein used to be generic and to include what are usually known as taps, slip soles, half soles, etc.

I claim:

1. The herein described method which consists in confining a sole-blank in a die or curb substantially encircling its edge, and subjecting the same pressure exerted upon the sides of the blank in a manner to substantially and permanently compress the interior body portion of the blank while leaving a marginal peripheral portion of such blank substantially uncompressed.

2. The herein described method which consists in confining a sole-blank in a die or curb substantially encircling its edge, and subjecting the same to pressure exerted upon the sides of the blank in a manner to substantially and permanently compress the interior body portion of the blank while leaving a marginal peripheral portion of such blank of more open texture and substantially thicker than the interior body portion.

3. The herein described method which consists in confining a sole blank in a die or curb substantially encircling its edge, and subjecting the same to pressure exerted upon the sides of the blank in a manner to substantially and permanently compress the interior body portion of the blank while leaving a marginal peripheral portion in such condition that stitches may be readily passed therethrough.

4. The method of thickening the edge of a sole leather outer sole which consists in confining the said edge against outward displacement tending to enlarge the area of the sole and, while the edge is so confined, supporting the entire grain side of the sole and subjecting a portion of the flesh side of less area than the entire area of the sole to pressure tending to reduce the thickness thereof while leaving the marginal portion beyond said compressed portion free to expand in a direction transverse to the face of the sole only, the said pressure and the confinement of the edge of the sole causing a permanent increase in thickness of said marginal portion.

WILLIAM B. GREENE.

Witnesses:

WILLIAM O. CUTLER,
WILLIAM A. MCEWAN.